United States Patent [19]

Liggett et al.

[11] Patent Number: 4,500,553

[45] Date of Patent: Feb. 19, 1985

[54] METHOD OF PRODUCING A FROZEN DUAL-TEXTURED CONFECTION

[75] Inventors: Louis G. Liggett, Brooklyn, N.Y.; Kevin W. Lang, River Vale; Clement R. Wyss, Hillsdale, both of N.J.; Richard A. Williams, Plymouth, Minn.

[73] Assignee: General Foods Corporation, White Plains, N.Y.

[21] Appl. No.: 519,353

[22] Filed: Aug. 1, 1983

[51] Int. Cl.³ ............................ A23G 9/00; A23G 9/26
[52] U.S. Cl. ..................................... 426/101; 426/249; 426/565; 426/576; 426/134
[58] Field of Search ............... 426/100, 101, 249, 565, 426/576, 134

[56] References Cited

U.S. PATENT DOCUMENTS

| | | | |
|---|---|---|---|
| 2,550,656 | 4/1951 | Knechtges | 426/565 |
| 2,558,453 | 6/1951 | Minster | 426/565 |
| 2,858,221 | 10/1958 | Laurie | 426/565 |
| 3,791,853 | 7/1976 | Crowder | 426/249 |
| 4,297,379 | 10/1981 | Topalian et al. | 426/565 |
| 4,391,834 | 7/1983 | Fiscella | 426/565 |

*Primary Examiner*—Jeanette M. Hunter
*Attorney, Agent, or Firm*—Thomas R. Savoie; Daniel J. Donovan; Richard L. Crisona

[57] ABSTRACT

A method of producing a frozen, dual-textured confection comprising a cream and a gelatin-containing aerated phase and a natural or simulated fruit phase is disclosed. According to one embodiment, gelatin is dispersed in water and the dispersion is then combined with cream, sweetener, emulsifier and a gum stabilizer to form a uniform emulsion. The emulsion is then partially frozen and aerated. A fluid, natural or simulated fruit component is separately produced by combining pureed fruit or synthetic fruit flavor, sweetener and a gum stabilizer. The partially frozen, aerated emulsion is passed together with a fruit component through a filler head into a mold or container so that the mold or container contains a cream and gelatin-containing phase and a fruit phase. The contents of the mold or container are then thoroughly frozen. A stick may be inserted into the mold prior to the thorough freezing so that the frozen confection may be hand-held while being eaten.

31 Claims, No Drawings

METHOD OF PRODUCING A FROZEN DUAL-TEXTURED CONFECTION

TECHNICAL FIELD

The present invention relates to a method of producing a frozen, dual-textured confection comprising a cream and gelatin-containing aerated phase and a natural or simulated fruit phase. More particularly, the invention involves combining a gelatin dispersion with cream, sweetener, milk solids, emulsifier and a gum stabilizer so as to produce an emulsion which is then partially frozen and aerated. A fluid, natural and/or simulated fruit component is separately produced by combining pureed fruit and/or a synthetic fruit flavor with water, a sweetener and a gum stabilizer. The emulsion and fruit are then passed through a filler head into a mold or container so that the mold or container contains a cream and gelatin-containing phase and a fruit phase. The contents of the mold or container are then thoroughly frozen.

BACKGROUND ART

Frozen, ready-to-eat products, particularly those on sticks, are well known in the art. Ice cream has long been available, but newer alternatives to ice cream are also available. For example, U.S. Pat. No. 3,669,687 to D'Ercole discloses a novel frozen pudding composition and a process for preparing the same. So too, U.S. Pat. No. 4,297,379 to Topalian et al. discloses a frozen aerated gelatin composition which is storage-stable, smooth and creamy without gummy or icy characteristics. While the aforementioned prior art compositions are generally characterized by a uniformly smooth and creamy texture, it is also desirable to produce a dual-textured frozen confection, particularly one having a fruit phase. Early attempts by the inventors herein at such a dual-textured confection were not successful because the fruit phase tended to be grainy and icy, destroying the smoothness desired for both phases.

It is an object of the invention to provide a method of producing a frozen, dual-textured confection comprising a cream and gelatin-containing aerated phase and a fruit phase.

A further object of the present invention is to provide a method of producing a frozen, dual-textured confection having both phases chacterized as smooth rather than grainy and icy.

DISCLOSURE OF THE INVENTION

It has now been found that the objects of the invention are met by a method involving combining a gelatin dispersion with cream, sweetener, milk solids, emulsifier and a gum stabilizer so as to provide an emulsion which is then partially-frozen and aerated. A natural or simulated fruit component is then separately produced by combining a pureed fruit and/or a synthetic fruit flower, water, a sweetener and a gum stabilizer. Both components are then passed together through a filler head into a mold or container so that the mold or container contains a cream and gelatin-containing aerated phase and a fruit phase. The contents of the mold or container are then thoroughly frozen. A stick may be inserted into the mold prior to freezing so that the frozen confection may be hand-held while being eaten. Alternatively, the frozen confection discharged from the mold may be placed between two cake-like wafers to give a product resembling an ice cream sandwich.

A cream and gelatin-containing aerated phase is first prepared. According to one embodiment, the phase is prepared by dispersing the gelatin in water and subsequently combining the other ingredients of the phase with the gelatin dispersion. The gelatin is dispersed in water maintained at a temperature sufficient to dissolve the gelatin, typically 70° C. to 82° C. The cream, emulsifier, sweetener, milk solids and gum stabilizer are then added to the gelatin dispersion and the whole combination is homogenized so as to form a stable emulsion having a gelatin content of from 8% to 2.5% by weight. The gelatin aids in the setting of the finished product but is also believed to act somewhat as an ice crystal growth stabilizer. The cream, preferably containing about 40% by weight milk fat, is typically added so as to comprise between 20% and 30% by weight of the finished cream and gelatin-containing emulsion. The emulsifiers are added at a level between about 0.3% and 0.5% by weight of the emulsion, with about 0.4% being the preferred level. The gum stabilizer typically comprises between 0.1% and 0.15% by weight of the emulsion. The sweetener, particularly various sugars, preferably represents from about 10% to 16% by weight of the emulsion, with about 13% by weight being preferred. The milk solids, preferably non-fat dry milk solids, are used as a thickener and to provide a dairy-type mouthfeel and are typically added to a level of from 3.8% to 7.5%, preferably 4.0% by weight of the emulsion. The remainder of the emulsion component is made up of water. The emulsion is prepared according to methods known in the art, such as combining the ingredients in a sufficiently agitated tank and subsequently passing the contents of the tank through an homogenizer.

An emulsifier is added at the level indicated so as to provide for a stable emulsion by helping to incorporate the cream in the gelatin dispersion. Useful emulsifiers are those known in the art which have been approved as safe and effective for food use. Such emulsifiers include, for example, hydroxylated lecithin, mono- or di-glycerides of fatty acids, stearyl-2-lactylates, sorbitan esters of fatty acids, as well as fatty esters of polyhydric alcohols. Other emulsifiers may, of course, be used but they tend to be less preferred than the specified emulsifiers.

A sweetener is added to provide the necessary sweetness to the cream and gelatin-containing aerated phase. Suitable sweeteners include sugars as well as the intensive sweeteners saccharin and aspartame. Typically useful sugars are selected from the group comprising sucrose, dextrose, glucose, fructose, high fructose corn syrup and combinations thereof. The sweetener may be added in solid form and subsequently dissolved in the gelatin dispersion in the amount hereinabove described. Alternatively, the sweetener may be first prepared as syrup which is then added to the dispersion at a level sufficient to provide an equivalent amount of solids.

The gum stabilizer is added to help bind the water in the frozen cream and gelatin-containing aerated phase as well as to aid in retarding the growth of ice crystals at freezer temperatures of about −18° C., extending the shelf life of the finished product. Binding the water in the cream and gelatin-containing phase is useful in preventing so-called weeping or dripping of the frozen confection upon melting. The gum stabilizers intended for use herein are those commonly used in food processing. Such appropriate gum stabilizers include algin, carrageenan, xanthan, locust bean gum, low methoxyl pectin, guar gum, hydroxypropyl methylcellulose, carboxymethylcellulose and combinations thereof. Although starch is a common stabilizer in many frozen confections, starch is useful but not the most preferred because of the grainy texture that starch typically imparts.

In addition to the hereinabove described ingredients, it is also desirable to add a fruit flavor to the cream and gelatin-containing phase so as to enhance the fruit flavor of the finished frozen, dual-textured confection. Although the fruit phase does in fact impart fruit flavor to the finished product, additional fruit flavor in the cream and gelatin-containing phase is preferable so as to give an even stronger fruit-flavored confection. The fruit flavor added to the cream and gelatin containing phase may be either natural or synthetic fruit flavor.

There are other ingredients that are optionally added as substitute and/or additional ingredients, depending on the desired end product. A milk protein, such as sodium caseinate, may be added to the emulsion as a whipping agent which also aids in the formation of the stable cream and gelatin-containing emulsion. The milk protein, if used, is added at a level between about 1.0% and 1.5% by weight, and preferably at about 1.2% by weight. A vegetable oil, such as hydrogenated coconut or palm kernel oils, may be used to replace some of the cream which is then added at a correspondingly lower level. Although the vegetable oil substantially duplicates the functionality of the milk fat in the cream, it is still preferable to maintain a certain level of cream in the finished product. Thus, the vegetable oil, if optionally added, is used at a level less than about 13.5% by weight and preferably at a level of about 11.0% by weight. A food acid, such as adipic acid, fumaric acid, malic acid, citric acid, tartaric acid and the like, may also be added to impart tartness to the finished frozen confection, if such tartness is desired. The food acid is added so as to adjust the pH of the emulsion to between 2.5 and 7.0, preferably 3.8 and 6.5.

Once all of the ingredients have been combined and the uniform emulsion having a gelatin content of from 0.8% to 2.5% by weight produced, the emulsion is then simultaneously cooled, aerated and agitated to produce a partially-frozen aerated composition having ice crystals within the range of 10–150 microns and an overrun of from 5% to 300%. Numerous types of equipment are known in the art for performing such simultaneous cooling, aeration and agitation but a scraped surface heat exchanger is preferred. Such a scraped surface heat exchanger is capable of both cooling the emulsion so as to provide ice crystals within the desired range as well as incorporating sufficient air into the composition so as to provide the desired overrun.

Having thus prepared the cream and gelatin-containing aerated phase, it is then necessary to prepare the fluid, fruit phase which may be either a natural or simulated fruit phase. In the case of a natural fruit phase, the appropriate fruit, strawberry, blueberry or peach, for example, is first pureed and then combined with water, a sweetener and a gum stabilizer. The pureed fruit preferably comprises between 40% and 60%, most preferably 50% by weight of the fruit phase. The sweetener is added to provide sweetness and may be selected from the group of sweeteners hereinbefore described. The sweetener is preferably added at from 24% to 36% by weight. The gum stabilizer is added at a level between about 0.6% and 0.8% by weight so as to prevent the fruit phase from becoming grainy and icy upon final freezing and storage at about −18° C., thereby eliminating one of the drawbacks found by the inventors to be associated with frozen, dual-textured confections. The appropriate gum stabilizer is also selected from the group of stabilizers hereinbefore described.

The gum stabilizer, particularly in combination with the monosaccharide and disaccharide sweeteners contributes to limiting the growth of ice crystals upon freezing and storage of the finished product. The ice crystal growth is preferably limited to the ice crystal size of the cream and gelatin-containing phase after 6 month storage at about −18° C. The most preferable ice crystal size is between 10 and 150 microns and provides for the desired smooth, non-icy or grainy frozen, dual-textured confection. Such controlled ice crystal growth in both phases of the frozen, dual-textured confection is a unique advantage of the present invention. Most commercially available ice creams for example, become unacceptably icy and grainy after storage for only three months at the even lower temperature of about −23° C. even though the lower temperature actually retards ice crystal growth.

Alternatively, the fruit phase may be a simulated fruit phase comprised of synthetic fruit flavor and other solids which mimic a natural fruit component. The synthetic fruit flavor is combined with water and a combination of sweeteners such as sugars and corn syrup solids so that the concentration is about that for the natural fruit phase, between about 20% and 40% by weight solids. A gum stabilizer, selected from the group hereinbefore described, is also added to provide control of ice crystal growth and prevent an icy or grainy texture. The simulateed fruit phase so produced is as suitable as the natural fruit phase and may be used when the cost or availability of fruit makes said natural fruit phase inconvenient to produce.

After the two compositions have been prepared, the partially frozen aerated composition and the fluid, fruit composition are then passed together through a filler head into a mold or container in a weight ratio between 99:1 and 1:1, preferably 19:1 and 2:1, so that the mold or container contains a cream and gelatin-containing phase and a separate fruit phase. The filler head will preferably swirl the colored fruit component into the partially frozen, aerated, composition so that a variegated product results. The filler head may be any type of dual nozzle, such as those known to workers skilled in the art, it being recognized that the selection of a particular nozzle is dependent upon the type and amount of variegation desired in the final product.

Once the mold or container has been filled with the two-phase confection, the contents of the mold or container are thoroughly frozen at a temperature less than about −10° C. In the case where the container is used, such as a sundae style cup, the container may then simply be stored at freezer temperatures for future consumption. In the case of a mold, it is preferable to insert a stick, wooden or plastic, into the mold prior to the thorough freezing step. The contents of the mold containing the confection and stick are then thoroughly frozen and discharged from the mold. This provides the frozen, dual-textured confection on a stick that may be hand-held while being eaten. The confection discharged from the mold may be provided with a thin ice coating, packaged and stored for later consumption. The frozen confection discharged from the mold, but without a stick, may also be placed between two cake-like wafers to give a product analogous to an ice cream sandwich, only using the dual-textured confection rather than ice cream.

In a preferred alternative embodiment of the present invention, a cream emulsion rather than cream is combined with the gelatin dispersion. According to this embodiment, water, cream, a sweetener, an emulsifier, a gum stabilizer and optionally, a milk protein and/or vegetable oil are combined, pasteurized and homogenized to form an aqueous emulsion component. The cream, most preferably containing about 40% by weight milk fat, is added to the aqueous emulsion component at a level of from about 25% to 40% by weight. The sweetener is added so as to comprise from about 25% to 40% by weight as well. The level of the emulsifier typically ranges between approximately 0.35% and 0.50% by weight. The gum stabilizer is added at a level, preferably from about 0.6% to 1.0% by weight. The sweetener, emulsifier and gum stabilizer, milk protein and vegetable oil are selected from the groups hereinbefore described. An aqueous gelatin dispersion component is prepared by combining water, gelatin, a gum stabilizer, a sweetener, milk solids and optionally, a food acid. The gum stabilizer and sweetener and milk solids are as hereinbefore described. The food acid may be selected from the group comprising adipic acid, fumaric acid, malic acid, citric acid, tartaric acid and the like, and is added so as to lower the pH of the dispersion to between 2.5 and 7.0, preferably 3.8 and 6.5. the aqueous emulsion and gelatin dispersion are combined in a weight ratio of from 4:1 and 1:4 to provide a uniform fluid emulsion. A fluid, fruit phase is then prepared as previously described and the remainder of the method is carried out as described in the first embodiment.

The following example is intended to illustrate certain embodiments of the present invention. The example is not meant to limit the invention beyond what is claimed below.

EXAMPLE

1. A cream emulsion is first prepared. Water and cream are combined in a batch tank and heated to about 40° C. Hydrogenated coconut and palm kernal oils are then added to the tank and the contents are heated to about 60° C. An emulsifier, polysorbate 60, is melted so as to become a liquid and added to the tank. A second emulsifier, sorbitan monostearate, is then added. Next, the milk protein sodium caseinate is added to the batch tank. Subsequently a preblended stabilizer component comprising xanthan gum and guar gum is added to the tank. The sweeteners sucrose and corn syrup are then added together with some salt. The proportion of each of the ingredients is shown in Table 1 below.

TABLE 1

| Composition of Cream Emulsion | |
|---|---|
| Ingredient | % by weight |
| Cream (40% milk fat) | 31.8 |
| Water | 25.3 |
| Coconut and Palm Kernel Oils | 14.0 |
| Sugar | 13.3 |
| Corn Syrup | 12.6 |
| Sodium Caseinate | 1.5 |
| Emulsifiers | 0.5 |
| Stabiliziers | 1.0 |
| Salt | <0.1 |

The contents of the tank are then pasteurized at about 65° C. for 30 minutes. The contents of the tank are passed through a two-step homogenizer with the pressure in the first stage being 600±100 psig and the pressure in the second stage being 8000±100 psig. The homogenized cream emulsion is subsequently cooled to about 18° C.

2. A gelatin dispersion is separately prepared. Water, heated to about 78° C., is measured into a second batch tank. A preblended stabilizer component comprising sugar, guar gum, xanthan gum, locust bean gum and hydroxypropyl methylcellulose is added to the tank and the contents are highly agitated for five minutes. A preblended mix of gelatin, non-fat dry milk, adipic acid, sugar, tapioca dextrin and trisodium citrate is added to the tank and the contents are highly agitated for no more than five minutes. Additional sugar is then added. A liquid, natural blueberry flavor is added next. The contents of the tank are cooled to and maintained at about 40° C. The proportion of each of the ingredients is shown in Table II below.

TABLE II

| Composition of Gelatin Dispersion | |
|---|---|
| Ingredient | % by weight |
| Water | 73.9 |
| Gelatin | 2.2 |
| Non-fat Dry Milk | 3.3 |
| Sugar | 16.7 |
| Adipic Acid | 0.5 |
| Tapioca Dextrin | 1.3 |
| Trisodium Citrate | 1.1 |
| Stabilizer Component | 0.7 |
| Natural Blueberry Flavor | 0.3 |

3. A fluid, fruit component is then prepared. Frozen, pureed blueberries are passed through an extructor and maintained for later use. Water is added to a third batch tank and heated to about 82° C. A preblended mixture of sugar, dextrose, xanthan gum, citric acid, trisodium citrate and blue coloring is added to the tank under high agitation. The pureed blueberries are then added under medium agitation. A liquid, natural blueberry flavor is added to the tank and the contents are then highly agitated for five minutes. The contents of the tank are then cooled to about 4° C. and held for further processing. The composition of the fluid, fruit component is shown in Table III below.

TABLE III

| Composition of Fluid, Fruit Component | |
|---|---|
| Ingredient | % by weight |
| Pureed Blueberries | 50.0 |
| Water | 29.7 |
| Sugar | 8.9 |
| Dextrose | 8.9 |
| Xanthan Gum | 0.5 |
| Citric Acid | 0.3 |
| Trisodium Citrate | 0.3 |
| Natural Blueberry Flavor | 1.3 |
| Blue Coloring | <0.01 |

4. The cream and gelatin-containing component is then formed by combining the cream emulsion and the gelatin dispersion in a tank under gentle agitation. The cream and gelatin-containing component is subsequently passed through a scraped surface heat exchanger into which air is simultaneously injected so that the exiting product has an overrun of about 20% and is at a temperature of about −3° C.

5. The partially frozen, aerated cream and gelatin-containing component and the fluid, fruit component are separately pumped to a dual nozzle filler head. The components are fed from the filler head at a proportion of 15% by weight fluid, fruit component and the combination is injected into a mold.

6. The mold is passed through a brine bath maintained at about −40° C. to thoroughly freeze the contents of the mold. The frozen, dual-textured confection is then discharged from the mold. The resulting confection have a blueberry flavor and both phases are organoleptically and visually distinct. Both phases have a smooth, non-grainy texture and a stable ice-crystal structure.

What is claimed is:

1. A method of producing a frozen, dual-textured confection comprising a cream and gelatin-containing aerated phase and a fruit phase which comprises the steps of:
    (a) dispersing the gelatin in water;
    (b) combining the gelatin dispersion with the cream, milk solids, an emulsifier, a sweetener, and a gum stabilizer and homogenizing the combination so as to form a uniform emulsion having a gelatin content of from 0.8% to 2.5% by weight;
    (c) passing the emulsion of (b) through a freezer in which the emulsion is simultaneously cooled, aerated and agitated to produce a partially frozen, aerated composition having ice crystals within the range of 10 to 150 microns and an overrun from 5% to 300%.
    (d) combining pureed fruit and/or synthetic fruit flavor, water, a sweetener and a gum stabilizer to form a fluid, fruit phase component having a solids content between about 20% and 40% by weight;
    (e) passing the partially-frozen, aerated composition in (c) together with a fruit component of (d) through a filler head and into a mold or contaner at a ratio of from 99:1 to 1:1 by weight so that upon filling, the mold or container contains a cream and gelatin-containing phase and a fruit phase; and
    (f) thoroughly freezing the contents of the mold or container.

2. A method as in claim 1 wherein the sweetener used in (b) is selcted from the group consisting of sucrose, dextrose, glucose, fructose, high fructose corn syrup and combinations thereof.

3. A method as in claim 1 wherein the emulsifier of (b) is selected from the group consisting of hydroxylated lecithin, mono- or di-glycerides of fatty acids, stearyl-2-lactylates, sorbitan ester of fatty acids and fatty esters of polyhydric alcohols.

4. A method as in claim 1 wherein the gum stabilizer of (b) is selected from the group consisting of starch, algin, carrageenan, xanthan, locust bean gum, low methoxyl pectin, guar gum, hydroxypropyl methylcellulose, carboxymethylcellulose, and combinations thereof.

5. A method as claim 1 wherein the sweetener of (d) is selected from the group consisting of sucrose, dextrose, glucose, fructose, high fructose corn syrup and combinations thereof.

6. A method as in claim 1 wherein the gum stabilizer of (d) is selected from the group consisting of algin, carrageenan, xanthan, locust bean gum, low methoxyl pectin, guar gum, hydroxypropyl methylcellulose, carboxymethylcellulose, and combinations thereof.

7. A method as in claim 1 which further comprises adding vegetable oil to the emulsion of (b).

8. A method as in claim 1 which further comprises adding food acid to the emulsion of (b).

9. A method as in claim 8 wherein the food acid is selective from the group consisting of adipic acid, fumaric acid, malic acid, citric acid and tartaric acid.

10. A method as in claim 1 which further comprises adding fruit flavor to the emulsion of (b).

11. A method as in claim 10 wherein the fruit flavor is synthetic fruit flavor.

12. A method as in claim 10 wherein the fruit flavor is natural fruit flavor.

13. A method as in claim 1 which further comprises inserting a stick into the mold prior to (f) and discharging the frozen, dual-textured confection subsequent to (f) so that the frozen, dual-textured confection may be hand-held by the stick while being eaten.

14. A method as in claim 1 wherein the fruit component is swirled in the partially frozen aerated composition during (e).

15. A method as in claim 14 wherein the fruit component comprises 5% to 35% by weight of the frozen, dual-textured confection.

16. The frozen, dual-textured confection produced by the method of claim 15.

17. A method of producing a frozen, dual-textured confection comprising a cream and gelatin-containing aearated phase and a fruit phase which comprises the steps of:
    (a) preparing an aqueous emulsion component by combining water, cream, a sweetener, an emulsifier and a gum stabilizer, pasteurizing the combination and homogenizing the pasteurized combination to form the aqueous emulsion component;
    (b) preparing an aqueous gelatin dispersion component by combining water, gelatin, milk solids, a gum stabilizer and a sweetener;
    (c) combining the aqueous emulsion component and the aqueous gelatin dispersion component at a ratio of from 4:1 to 1:4 so as to form a uniform fluid blend;
    (d) passing the uniform fluid blend of (c) through a freezer where it is simultaneously cooled, aerated and agitated to produce a partially frozen, aerated composition having ice crystals within the range of 10 to 150 microns and an overrun of from 5% to 86%;
    (e) combining pureed fruit and/or synthetic fruit flavor, water, a sweetener and a gum stabilizer to form a fluid, fruit phase having a solids content between about 20% and 40% by weight;
    (f) passing the partially-frozen, aerated composition of (d) and the fluid, fruit phase component of (e) through a filler head and into a mold or container at a ratio of form 99:1 to 1:1 by weight so that after filling, the mold or container contains a cream and gelatin-containing phase and a fruit phase; and
    (g) thoroughly freezing the contents of the mold or container.

18. A method as in claim 17 wherein the sweetener used in (b) is selected from the group consisting of sucrose, dextrose, glucose, fructose, high fructose corn syrup and combinations thereof.

19. A method as in claim 17 wherein the emulsifier of (b) is selected from the group consisting of hydroxylated lecithin, mono- di-glycerides of fatty acids, stearyl-2-lactylates, sorbitan ester of fatty acids and fatty esters of polyhydric alcohols.

20. A method as in claim 17 wherein the gum stabilizer of (b) is selected from the group consisting of starch, algin, carrageenan, xanthan, locust bean gum, low methoxyl pectin, guar gum, hydroxypropyl methylcellulose, carboxymethylcellulose and combinations thereof.

21. A method as in claim 17 wherein the sweetener of (e) is selected from the group consisting of sucrose, dextrose, glucose, fructose, high fructose corn syrup and combinations thereof.

22. A method as in claim 17 wherein the gum stabilizer of (e) is selected from the group consisting of algin, carrageenan, xanthan, locust bean gum, low methoxyl pectin, guar gum, hydroxypropyl methylcellulose, carboxymethylcellulose and combinations thereof.

23. A method as in claim 17 which further comprises adding food acid to the gelatin dispersion of (b).

24. A method as in claim 23 wherein the food acid is selected from the group consisting of adipic acid, fumaric acid, malic acid, citric acid and tartaric acid.

25. A method as in claim 17 which further comprises adding fruit flavor to the uniform fluid blend of (c).

26. A method as in claim 25 wherein the fruit flavor is synthetic fruit flavor.

27. A method as in claim 25 wherein the fruit flavor is natural fruit flavor.

28. A method as in claim 17 which further comprises inserting a stick into the mold prior to (g) and discharging the frozen, dual-textured confection subsequent to (g) so that the frozen, dual-textured confection may be hand-held by the stick while being eaten.

29. A method as in claim 17 wherein the fruit component is swirled in the partially frozen aerated composition during (f).

30. A method as in claim 29 wherein the fruit component comprises 5% to 33% by weight of the frozen, dual-textured confection.

31. The frozen, dual-textured confection produced by the method of claim 30.

* * * * *